United States Patent [19]

Bannon

[11] Patent Number: 4,484,986

[45] Date of Patent: Nov. 27, 1984

[54] PROCESS FOR DISTILLATION AND CONDENSATION

[75] Inventor: Robert P. Bannon, Houston, Tex.

[73] Assignee: Shell Oil Company, Houston, Tex.

[21] Appl. No.: 497,476

[22] Filed: May 23, 1983

[51] Int. Cl.³ .............................................. B01D 3/14
[52] U.S. Cl. ....................................... 203/42; 203/39; 203/87; 203/98; 202/185 A; 208/349; 208/368; 208/369
[58] Field of Search .................... 203/42, 87, 39, 94, 203/98, DIG. 9; 208/342, 342, 349, 357, 358, 368, 369; 202/185 A, 186, 182–184; 196/99, 140; 62/17, 29

[56] References Cited

U.S. PATENT DOCUMENTS

| | | | |
|---|---|---|---|
| 2,398,396 | 4/1946 | Powell | 203/87 |
| 2,915,462 | 12/1959 | Salmon | 202/185 A |
| 3,039,941 | 6/1962 | Sweeney et al. | 203/87 |
| 3,320,159 | 5/1967 | Potts | 203/87 |
| 3,401,093 | 9/1968 | Cox | 203/87 |
| 3,427,228 | 2/1969 | Constantikes et al. | 203/87 |
| 3,493,470 | 2/1970 | Irvin | 203/87 |
| 3,824,177 | 7/1974 | Honerkamp et al. | 203/42 |
| 4,235,706 | 11/1980 | Bannon | 203/87 |

*Primary Examiner*—Wilbur Bascomb
*Attorney, Agent, or Firm*—Albert J. Adamcik

[57] ABSTRACT

A process for distilling and condensing a multi-component liquid is described, the process being characterized by the use of a portion of uncondensed vapor in achieving more efficient heat utilization. In a principal embodiment, a multi-component liquid is distilled to produce an overhead vapor, the vapor is partially condensed, and the vapor-condensate is separated into a minor liquid fraction and a major vapor-liquid portion. The major vapor-liquid fraction is then separated into vapor and liquid, and the liquid therefrom is accumulated in an accumulation zone. The separated vapor is then contacted with the minor liquid fraction in a contacting zone, thereby absorbing the vapor and transferring its heat to the liquid fraction.

22 Claims, 2 Drawing Figures

PROCESS FOR DISTILLATION AND CONDENSATION

BACKGROUND OF THE INVENTION

Rapid escalation of energy costs in recent years has spurred efforts to improve efficiency in plant operations. Distillation practices have received great attention, since the process of distillation, the predominant unit operation in the oil refining and chemical industries, consumes prodigious amounts of energy.

One energy-saving procedure is the practice of multiple stage, e.g., two-stage, condensation of the overhead vapors from a distillation column. Multi-stage condensation procedures allow energy savings by permitting the use of higher temperature at which heat may be removed from the overhead vapor. Such a process is described, for example, in U.S. Pat. No. 3,320,159. In at least one two-stage procedure for condensation of distillation column overhead vapors, the first stage of condensation is operated under conditions to condense just enough liquid to provide reflux for the distillation column, and the second stage of condensation is operated under conditions to provide the top product of the column. For two-stage condensation to be of value in heat recovery, the vapor or top product from the distillation column must be a multicomponent mixture, and there must be a reasonable temperature spread between its dew point and bubble point, e.g., 20 degrees F. Most hydrocarbon distillations fit this requirement.

A very common commercial process for which two-stage condensation can be helpful is the separation of gasoline boiling range materials (often 400° to 430° F. ASTM end point) as the top product from a feed containing also kerosene, jet fuel, distillate fuel and gas oil components. Two-stage condensation procedures, however, have the disadvantages of added capital cost and increased complexity. In general, the process, as known, has required the use of two accumulators, with interconnecting piping, pumps, etc. U.S. Pat. No. 4,235,706, issued Nov. 5, 1980, and incorporated herein by reference, describes an improved process for distillation and multi-stage condensation of a multicomponent vapor, the process being characterized by the integration and utilization of a unique accumulation zone, thereby providing effective reflux and reduced capital costs.

In the typical distillation column, the operating pressure is set so that overhead vapor may be condensed with the available cooling medium, usually cooling water or air. Normally, it is advantageous to keep the pressure as low as possible to increase the relative volatility of the feed components and thus lessen the reflux required for a given separation. As a consequence, the top product from the column is relatively cool; typically, only 20°–40° F. above the temperature of the cooling medium. If this product must be further processed at a higher temperature, for example, by further distillation, it must be reheated. The present invention seeks to conserve energy present in the vapor fraction from the distillation, and thereby reduce the overall energy consumption of the procedure.

SUMMARY OF THE INVENTION

Accordingly, the invention, in one embodiment, relates to a process comprising, (a) distilling a multi-component liquid in a distillation column under conditions effective to provide an overhead condensable vapor;

(b) condensing at least the bulk of the overhead condensable vapor in a condensation zone, and producing a condensation zone effluent comprising liquid or vapor and liquid;

(c) passing condensation zone effluent to a separation zone, and separating a first liquid fraction from said effluent, and passing remaining condensation effluent to an accumulation zone;

(d) cooling first liquid fraction, and passing cooled first liquid fraction to a contacting zone;

(e) separating remaining vapor, if any, from the condensation zone effluent, and contacting cooled first liquid fraction with said remaining vapor in said contacting zone, and/or separating a minor portion of vapor from the overhead condensable vapor and contacting cooled first liquid fraction with at least a portion of said minor portion in said contacting zone, and producing a second liquid fraction; and (f) collecting second liquid fraction from step (e) in the accumulation zone.

In its preferred form, the invention utilizes the accumulation zone technique of my previous patent. Thus, the accumulation zone comprises a first accumulation section and a second accumulation section having vapor communication with the first accumulation section but being separated from said first accumulation section by a barrier which provides limited flow of liquid between the first accumulation section and the second accumulation section, the first accumulation section and the second accumulation section being at different liquid temperatures. In this embodiment, reflux liquid is preferably returned to the column from the first accumulation section, vapor and liquid from the condensation zone are separated in the first accumulation section, and vapor from both accumulation sections is passed to the vent contactor. Product is preferably withdrawn from the second accumulation section.

In a preferred embodiment, the invention relates to a process comprising, (a) distilling a multi-component liquid in a distillation column under conditions effective to provide an overhead vapor fraction having a temperature differential of at least 20° F. between its dew point and its bubble point;

(b) condensing a portion of the overhead fraction in a condensation zone having at least one condensation stage, and producing liquid condensate and partially cooled vapor;

(c) passing liquid condensate to an accumulation zone, and passing partially cooled vapor from step (b) to a second condensation zone having at least one condensation stage;

(d) condensing at least the bulk of the partially cooled vapor in the second condensation zone, and producing a condensation zone effluent comprising liquid or vapor and liquid;

(e) passing condensation zone effluent to a separation zone, and separating a first liquid fraction from said effluent, and passing remaining condensation zone effluent to an accumulation zone;

(f) cooling first liquid fraction, and passing cooled first liquid fraction to a contacting zone;

(g) separating remaining vapor, if any, from the condensation zone effluent, and contacting cooled first liquid fraction with said remaining vapor in said contacting zone, and/or separating a minor portion of vapor from the partially cooled vapor and contacting cooled first liquid fraction with at least a portion of said minor portion of partially cooled vapor in said contacting zone, and producing a second liquid fraction; and (h) collecting second liquid fraction from step (g) in the accumulation zone.

Most preferably, the accumulation zone used in step (h) is that employed in step (c), although a separate accumulation zone may be used. Preferably, this embodiment also utilizes the accumulation zone technique of my previous patent. Thus, the accumulation zone may comprise a first accumulation section and a second accumulation section having vapor communication with the first accumulation section but being separated from said first accumulation section by a barrier which provides limited flow of liquid between the first accumulation section and the second accumulation section, the first accumulation section and the second accumulation section being at different liquid temperatures. In this embodiment reflux liquid is preferably returned to the column from the first accumulation section, and vapor from both accumulation sections is passed to the vent contactor. Product is preferably withdrawn from the second accumulation section.

The liquid condensed may be collected in or after all, or fewer than all, of the condensation stages employed. As used herein, the term "condensation stage" or "stages", or variants thereof, refers to units or apparatus, individually or collectively, employed in converting vaporous material, under suitable conditions of temperature and pressure, to liquid. Collected liquids may be individually or collectively passed to one or more accumulation zones, each zone having a number of sections separated by barriers. The number of sections is equal to or less than the number of liquids passed to the particular accumulation zone.

The precise volume of liquid separated as first liquid fraction will depend on the many variables of the process, and may be determined by those skilled in the art. In general, from 5 percent to 50 percent by weight, based on the volume of liquid condensed in the condensation zone or second condensation zone, will be separated. The key, as discussed further hereinafter, is the maximization of the heat content of the liquid fraction collected in the accumulation zone. In general, the volume of first liquid fraction to be cooled will depend on the temperature level desired in the product sections of the accumulator.

The invention may be applied to any liquid suitable for distillation and multi- or two-stage condensation. For example, the invention may be employed in crude oil distillation processes, and in distillation of products from conversion processes such as catalytic cracking, hydrocracking, and delayed coking. The invention is preferably utilized in distillation processes in which the top product separated in a gasoline fraction. As indicated, the top product should be a multi-component mixture, and there should be a reasonable temperature differential, say at least 20° F., preferably from 20° F. to 225° F., between its dew point and bubble point. However, the invention is also suitable for separations of substantially pure product, such as the separation of isopentane from n-pentane. In such cases, no substantial advantage accrues from the use of the procedure of the second embodiment as compared to the use of the procedure of the first embodiment. The particular conditions applied, i.e., pressure, temperature, throughput, etc., are those applicable to multi- or two-stage condensation, and are well understood by those skilled in the art. In any event, the salient feature of the invention is the use of condensation zone effluent vapor to enhance heat content of the liquid in the effluent from the condenser. By utilizing the heat of this vapor, additional processing steps on the product, such as distillation, do not require as much heat input.

DETAILED DESCRIPTION OF THE INVENTION

In order to describe the invention in greater detail, reference is made to the accompanying schematic drawing.

FIG. 1 illustrates the general concept of the invention, while

Figure 1:
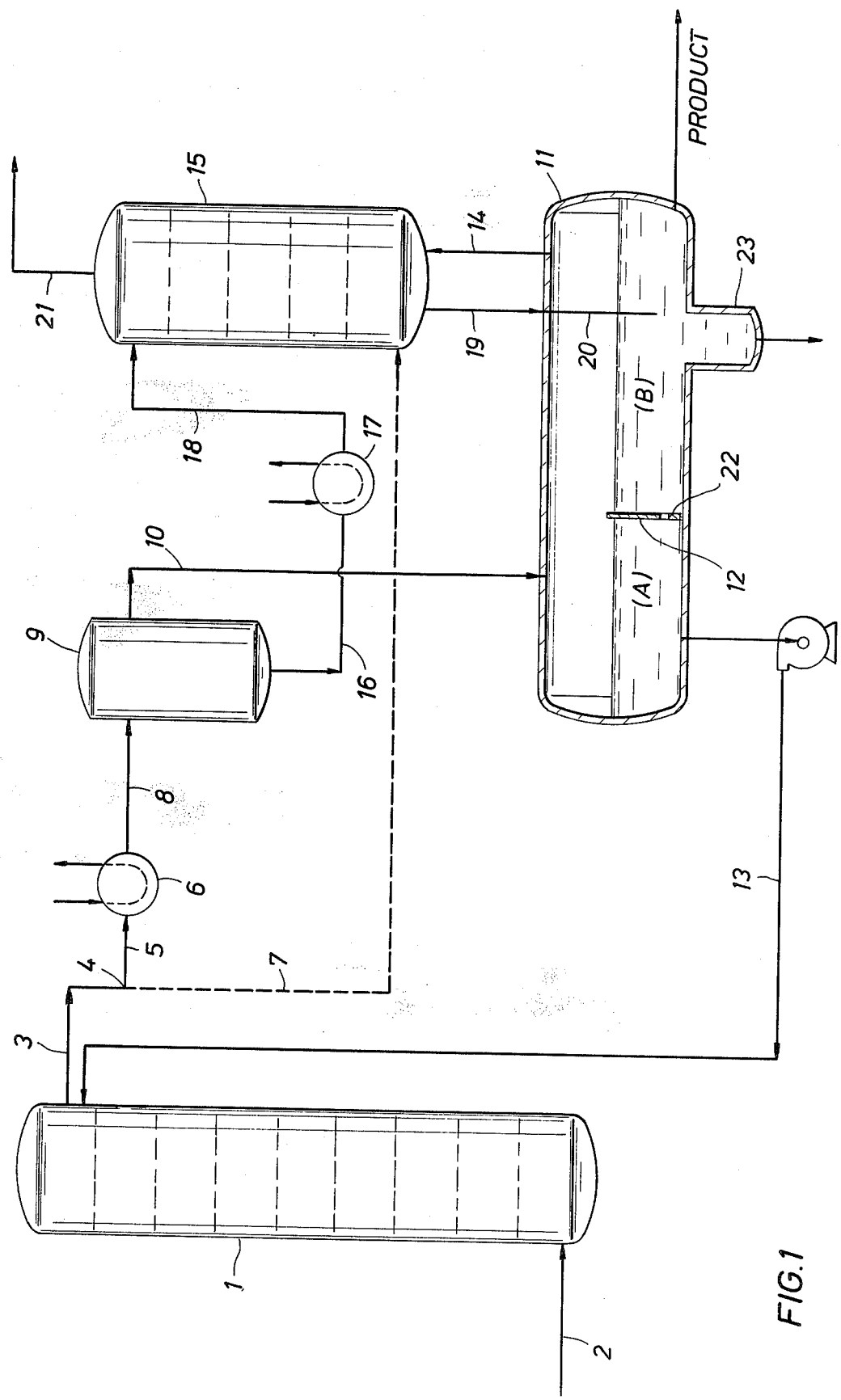

All values mentioned are calculated or exemplary. Moreover, the invention will be described with use of the accumulation zone of my previous patent, although those skilled in the art will recognize that a non-partitioned zone may be employed. Accordingly, in FIG. 1, numeral (1) designates a distillation column, preferably a fractionating column for a naphtha top product. The feed, e.g., crude oil, enters column (1) through line (2), and is fractionated in a known fashion. Various draw-offs are provided (not shown), and overhead vapor exits column (1) through line (3) at a temperature of about 340° F. The overhead vapor may be divided optionally at (4) into major and minor portions, the major portion proceeding through line (5) to condenser (6). The optional minor portion, which may be about 10 percent by weight, based on the total weight of the overhead fraction, may be removed via line (7), as more fully discussed hereinafter.

In condenser (6) the bulk of the overhead fraction or of the major portion of the overhead fraction is condensed. For purposes of this illustration, the overhead is assumed to have a condensation range of about 200° F., e.g., to condense between about 340° F. and 140° F. at column operating pressure. The amount condensed is that sufficient to provide reflux for column (1) and adequate product recovery. Those skilled in the art may readily determine the amount to be condensed to satisfy these requirements. Any suitable type of condensation or heat exchange system may be employed, as will also be evident to those skilled in the art. Preferably, the vapor may be partially condensed, either by indirect heat exchange with another process stream, by air cooling, or by direct contact with condensate that has been cooled by exchange. As will be recognized by those skilled in the art, conditions may be adjusted to condense all the vapor. In such a case, contactor vapor is provided via line (7).

From unit (6), the vapor-liquid stream is passed through line (8) to separator (9). Separation unit (9) may be of the centrifugal type, or may be a knockout pot. In unit (9), the vapor-liquid stream from condenser (6) is separated into two portions, the major vapor-liquid fraction, which is passed via line (10) to accumulator (11), and a minor first liquid fraction, which is removed via line (16). By way of example, the first liquid fraction may comprise 10 percent by weight of a given volume of vapor-liquid stream leaving condenser (6). The external design of accumulating zone (11) may vary considerably, but preferably the accumulation zone is provided with a barrier (12) which divides the zone into two separate liquid-containing sections, there being only limited liquid communication between the two sections, as will be illustrated later. At the same time, barrier (12) is constructed so that it does not limit vapor flow in accumulating zone (11). Accordingly, the vapor-liquid stream in line (10) enters accumulating zone (11) where liquid separates out in the phase separation, accumulation section (A) formed by the walls of unit (11) and barrier (12). Vapor is free, however, to occupy the entire open volume of unit (11). The temperature of liquid in section (A) will be about 180° F. Liquid from section (A) is returned via line (13) to column (1) to provide the reflux mentioned previously.

Vapor from zone (11) is passed through line (14) to vent contactor (15). Concomitantly, a stream of liquid from separation unit (9), the first liquid fraction, is withdrawn via line (16), cooled in heat exchanger (17), and forwarded, via line (18), to contactor (15). As indicated, the cooled stream in line (18), upon entry into contactor (15), serves to absorb and condense additional components from the vapor in line (14), and the liquid is reheated. If a split of the vapor in line (3) has been made, and the split vapor forwarded, as noted, via line (7), the vapor also serves to enhance the heat content of liquid in column (15). Contactor (15) may be of any suitable type, but is preferably a small tray contactor having, e.g., 3 to 5 trays. The vapor leaving contactor (15) suitably has a temperature of from 100° to 120° F. As illustrated, the liquid recovered in contactor (15), i.e., condensate, absorbed vapor and liquid from line (18), passes or flows to, and collects in the accumulating section (B) of zone (11) through a sealed dip leg (19) to counterbalance the pressure drop through line (14). Any "non-condensables" from vent contactor (15) may be processed by conventional techniques via line (21). While a minor portion of the vapor in the open space above section (B) will condense, such condensation is not of major significance.

The volume or quantity of liquid separated via line (16) will range from 5 percent to 50 percent of the liquid condensed in condenser (6), the amount preferably being from 10 percent to 40 percent, based on the weight of the liquid condensed.

As indicated, the barrier separating zone (11) into two sections is limited so that the sections have open vapor communication to allow vapor flow and pressure equalization between the sections. Barrier (12) is provided further with an opening (22) near or at the bottom thereof, for liquid level balance and for flow of heavy second liquid phase to boot (23) for separate drawoff. The size of the opening is determined by the volumes of liquid to be balanced, keeping in mind that significant mixing of the liquids in sections (A) and (B) is not desired. The "opening" may, as will be understood by those skilled in the art, be a multiplicity of smaller openings, the total cross-sectional area of the openings being such as to fulfill the requirements noted. In the illustration, given an accumulating vessel or zone having the dimensions 12 ft. in diameter by 20 ft. tangent to tangent, opening (22) may be simply a hole 6 inches by 6 inches. Barrier (12) may be constructed of any suitable impermeable material, such as steel or ceramic, and the opening should be baffled to prevent convection flow. Barrier (12) may be insulated to reduce heat flow from section (A) to section (B).

Figure 2:
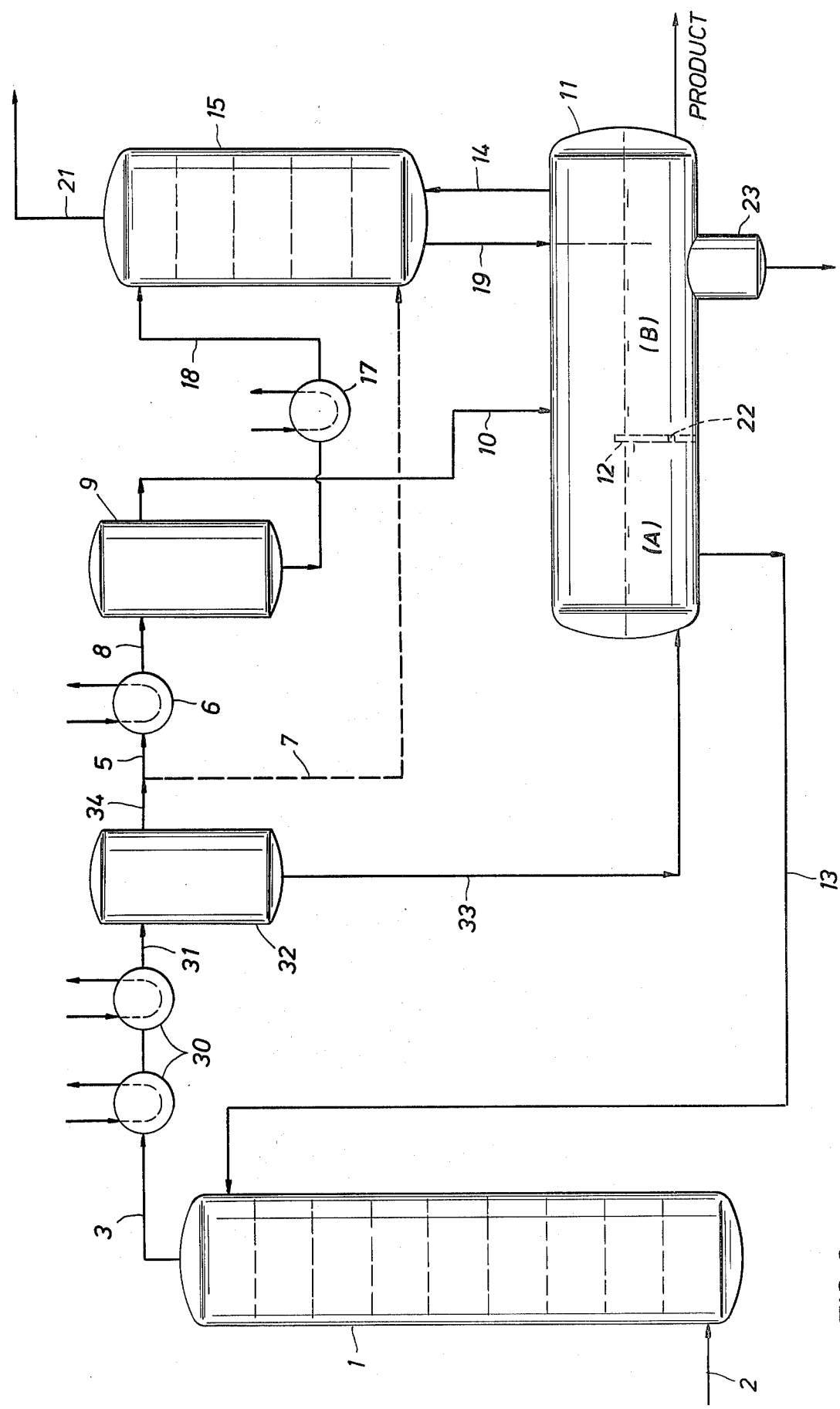
FIG. 2 represents a preferred embodiment of the invention.

In FIG. 2, similar numbers represent similar features. As illustrated, the procedure of FIG. 2 employs the accumulator or accumlation techniques of my aforementioned patent, although this is not critical. Accordingly, the feed enters column (1) through line (2), and is fractionated in a manner known to those skilled in the art. The overhead vapor fraction in line (3), at a temperature of about 380° F., is condensed in condensation zone (30), preferably in a series of condensation stages. For example, the condensers may comprise shell and tube heat exchangers wherein a colder process stream is heated. Preferably, the overhead fraction is cooled to about 340° F., thus condensing enough liquid for reflux. Those skilled in the art may readily determine the amount to be condensed for adequate reflux of the distillation column. From the last stage, a liquid-vapor stream is forwarded via line (31) to separation zone (32) where the vapor and liquid are separated. Separation zone (32) may comprise a centrifugal separator or merely a knockout pot. Liquid is removed from zone (32) via line (33), and is forwarded to accumulator (11). Accumulator (11) follows generally the design mentioned in relation to FIG. 1. Accordingly, the liquid stream in line (33) enters accumulating zone (11) where it settles in accumulation section (A) formed by the walls of unit (11) and barrier (12). Vapor may occupy the entire open volume of unit (11). The temperature of liquid in section (A) will be about 340° F. Liquid from section (A) is returned via line (13) to column (1) to provide the reflux mentioned previously. Vapor from zone (11) may be passed through line (14) to vent contactor (15).

Concomitantly, the vapor removed in separator (32) proceeds to condensation zone (6) via line (5). A minor portion, which represents about 10 percent by weight, based on the total weight of the overhead fraction, may be removed via line (7) (dotted line), as noted previously.

In condensation zone (6), the bulk of the stream in line (5) is condensed. For purposes of this illustration, the overhead is assumed, as above, to have a condensation range of about 200° F., e.g., to condense between about 340° F. and 140° F. at column operating pressure. In this case, the amount condensed in unit (6) is that sufficient to provide adequate product recovery. Condensation units and techniques similar to those illustrated in connection with FIG. 1 may be employed, as will be evident to those skilled in the art. From zone (6), the liquid or vapor-liquid stream is passed through line (8) to separator (9). Operation of this embodiment hereinafter is similar to the procedure employed in connection with FIG. 1.

As will be recognized by those skilled in the art, the key to the invention is the contacting of a cooled liquid portion of the overhead with the warmer vapor portion of the overhead. This permits operation of the product section of the accumulator at a higher temperature, and less heat will be required for further processing of the top-product.

The detailed description exemplifies a column overhead vapor composed of a mixture of compounds of differing boiling points, so that there is a temperature spread between the bubble and dew points of the mixture. The invention is most advantageously applied to such a mixture, particularly in the arrangement of FIG. 2. However, it is also useful, as noted, for the distillation of mixtures producing pure or nearly pure compound as top product. It is not practical to operate the condenser of such a column to produce liquid product at its bubble point without loss of some product as vapor. Therefore, out of practical necessity, condensers of such columns are operated to subcool the product to prevent this loss of vapor. Use of this invention will allow the reheating of product to the bubble point without the vapor loss.

What is claimed is:

1. A process comprising
   (a) distilling a multi-component liquid in a distillation column under conditions effective to provide an overhead condensable vapor;
   (b) condensing the bulk of the overhead condensable vapor in a condensation zone, and producing a condensation zone effluent comprising vapor and liquid;
   (c) passing condensation zone effluent from step (b) to a separation zone, and separating said condensation zone effluent into a major vapor-liquid fraction and a minor first liquid fraction, and passing said major vapor-liquid fraction to an accumulation zone;
   (d) removing said first liquid fraction from said separation zone and cooling the removed first liquid fraction, and passing the cooled removed first liquid fraction to a contacting zone;
   (e) separating vapor from the major vapor-liquid fraction, and contacting cooled removed first liquid fraction with said separated vapor in the contacting zone, and producing a second liquid fraction in said contacting zone; and
   (f) collecting second liquid fraction from step (e) in the accumulation zone.

2. The method of claim 1 wherein the accumulation zone comprises a first accumulation section and a second accumulation section having vapor communication with the first accumulation section but being separated from said first accumulation section by a barrier which provides limited flow of liquids between the first accumulation section and the second accumulation section, the first accumulation section and the second accumulation section being at different liquid temperatures, and wherein reflux liquid is returned to the column from the first accumulation section, and vapor from both accumulation sections is passed to the contacting zone.

3. A process comprising
   (a) distilling a multi-component liquid in a distillation column under conditions effective to provide an overhead vapor fraction having a temperature differential of at least 20° F. between its dew point and its bubble point;
   (b) condensing the bulk of the overhead vapor fraction in a condensation zone, and producing a condensation zone effluent comprising vapor and liquid;
   (c) passing condensation zone effluent from step (b) to a separation zone, and separating said condensation zone effluent into a major vapor-liquid fraction and a minor first liquid fraction, and passing said major vapor-liquid fraction to an accumulation zone;
   (d) removing said first liquid fraction from said separation zone and cooling the removed first liquid fraction, and passing the cooled removed first liquid fraction to a contacting zone;
   (e) separating vapor from the major vapor-liquid fraction, and contacting cooled removed first liquid fraction with said separated vapor in the contacting zone, and producing a second liquid fraction in said contacting zone, and
   (f) collecting second liquid fraction from step (e) in the accumulation zone.

4. The method of claim 3 wherein the accumulation zone comprises a first accumulation section and a second accumulation section having vapor communication with the first accumulation section but being separated from said first accumulation section by a barrier which provides limited flow of liquids between the first accumulation section and the second accumulation section, the first accumulation section and the second accumulation section being at different liquid temperatures, and wherein reflux liquid is returned to the column from the first accumulation section, and vapor from both accumulation sections is passed to the contacting zone.

5. The method of claim 4 wherein the multi-component liquid is a crude oil.

6. A process comprising
   (a) distilling a multi-component liquid in a distillation column under conditions effective to provide an overhead condensable vapor;
   (b) separating a minor portion of vapor from the overhead condensable vapor;
   (c) condensing the remaining overhead condensable vapor in a condensation zone, and producing a liquid condensation zone effluent;
   (d) passing liquid condensation zone effluent from step (c) to a separation zone, and separating a first liquid fraction from said liquid condensation zone effluent, and passing the remaining liquid condensation zone effluent to an accumulation zone;
   (e) removing said first liquid fraction from said separation zone and cooling the removed first liquid fraction, and passing the cooled removed first liquid fraction to a contacting zone;
   (f) contacting cooled removed first liquid fraction from step (e) with at least a portion of said minor portion of vapor from step (b) in the contacting zone, and producing a second liquid fraction in said contacting zone; and
   (g) collecting second liquid fraction from step (f) in the accumulation zone.

7. The method of claim 6 wherein the accumulation zone comprises a first accumulation section and a second accumulation section having vapor communication with the first accumulation section but being separated from said first accumulation section by a barrier which provides limited flow of liquids between the first accumulation section and the second accumulation section, the first accumulation section and the second accumulation section being at different liquid temperatures, and wherein reflux liquid is returned to the column from the first accumulation section, and vapor from both accumulation sections is passed to the contacting zone.

8. A process comprising
   (a) distilling a multi-component liquid in a distillation column under conditions effective to provide an overhead vapor fraction having a temperature differential of at least 20° F. between its dew point and its bubble point;
   (b) separating a minor portion of vapor from the overhead vapor fraction;
   (c) condensing the remaining overhead vapor fraction in a condensation zone, and producing a liquid condensation zone effluent;
   (d) passing liquid condensation zone effluent from step (c) to a separation zone, and separating a first liquid fraction from said liquid condensation zone effluent, and passing the remaining liquid condensation zone effluent to an accumulation zone;

(e) removing said first liquid fraction from said separation zone and cooling the removed first liquid fraction, and passing the cooled removed first liquid fraction to a contacting zone;

(f) contacting cooled removed first liquid fraction from step (e) with at least a portion of said minor portion of vapor from step (b) in the contacting zone, and producing a second liquid fraction in said contacting zone; and (g) collecting second liquid fraction from step (f) in the accumulation zone.

9. The method of claim 8 wherein the accumulation zone comprises a first accumulation section and a second accumulation section having vapor communication with the first accumulation section but being separated from said first accumulation section by a barrier which provides limited flow of liquids between the first accumulation section and the second accumulation section, the first accumulation section and the second accumulation section being at different liquid temperatures, and wherein reflux liquid is returned to the column from the first accumulation section, and vapor from both accumulation sections is passed to the contacting zone.

10. The method of claim 9 wherein the multi-component liquid is a crude oil.

11. A process comprising
(a) distilling a multi-component liquid in a distillation column under conditions effective to provide an overhead condensable vapor;
(b) separating a minor portion of vapor from said overhead condensable vapor;
(c) condensing the bulk of the remaining overhead condensable vapor in a condensation zone, and producing a condensation zone effluent comprising vapor and liquid;
(d) passing condensation zone effluent from step (c) to a separation zone, and separating said condensation zone effluent into a major vapor-liquid fraction and a minor first liquid fraction, and passing said major vapor-liquid fraction to an accumulation zone;
(e) removing said first liquid fraction from said separation zone and cooling the removed first liquid fraction, and passing the cooled removed first liquid fraction to a contacting zone;
(f) separating vapor from the major vapor-liquid fraction;
(g) contacting vapor separated from the major vapor-liquid fraction and at least a portion of said minor portion of vapor from step (b) with cooled removed first liquid fraction in the contacting zone, and producing a second liquid fraction;
(h) collecting second liquid fraction from step (g) in the accumulation zone.

12. The method of claim 11 wherein the accumulation zone comprises a first accumulation section and a second accumulation section having vapor communication with the first accumulation section but being separated from said first accumulation section by a barrier which provides limited flow of liquids between the first accumulation section and the second accumulation section, the first accumulation section and the second accumulation section being at different liquid temperatures, and wherein reflux liquid is returned to the column from the first accumulation section, and vapor from both accumulation sections is passed to the contacting zone.

13. The method of claim 12 wherein the multi-component liquid is a crude oil.

14. A process comprising
(a) distilling a multi-component liquid in a distillation column under conditions effective to provide an overhead vapor fraction having a temperature differential of at least 20° F. between its dew point and its bubble point;
(b) condensing a portion of the overhead fraction in a condensation zone having at least one condensation stage, and producing liquid condensate and partially cooled vapor;
(c) passing liquid condensate from step (b) to an accumulation zone, and passing partially cooled vapor from step (b) to a second condensation zone having at least one condensation stage;
(d) condensing the bulk of said partially cooled vapor in the second condensation zone, and producing a condensation zone effluent comprising vapor and liquid;
(e) passing condensation zone effluent from step (c) to a separation zone, and separating said condensation zone effluent into a major vapor-liquid fraction and a minor first liquid fraction, and passing said major vapor-liquid fraction to an accumulation zone;
(f) removing said liquid fraction from said separation zone and cooling the removed first liquid fraction, and passing the cooled removed first liquid fraction to a contacting zone;
(g) separating vapor from the major vapor-liquid fraction, and contacting cooled removed first liquid fraction step (f) with the separated vapor in said contacting zone, and producing a second liquid fraction; and
(h) collecting second liquid fraction from step (g) in the accumulation zone.

15. The method of claim 14 wherein a single accumulation zone is used for steps (c), (e) and (g), and the accumulation zone comprises a first accumulation section and a second accumulation section having vapor communication with the first accumulation section but being separated from said first accumulation section by a barrier which provides limited flow of liquids between the first accumulation section and the second accumulation section, the first accumulation section and the second accumulation section being at different liquid temperatures, and wherein reflux liquid is returned to the column from the first accumulation section, and vapor from both accumulation sections is passed to the contacting zone.

16. The method of claim 15 wherein the multi-component liquid is a crude oil.

17. A process comprising
(a) distilling a multi-component liquid in a distillation column under conditions effective to provide an overhead vapor fraction having a temperature differential of at least 20° F. between its dew point and its bubble point;
(b) condensing a portion of the overhead fraction in a first condensation zone having at least one condensation stage, and producing a first condensation zone effluent comprising liquid condensate and partially cooled vapor;
(c) separating a minor portion of vapor from said first condensation zone effluent;
(d) passing liquid condensate from step (b) to an accumulation zone, and passing remaining partially cooled vapor producing in step (c) to a second condensation zone having at least one condensation stage;

(e) condensing remaining partially cooled vapor produced in step (c) in the second condensation zone, and producing a liquid condensation zone effluent;

(f) passing liquid condensation zone effluent from step (e) to a separation zone, and separating a first liquid fraction from said liquid condensation zone effluent, and passing remaining liquid condensation zone effluent to an accumulation zone;

(g) removing said first liquid fraction from said separation zone and cooling the removed first liquid fraction, and passing the cooled removed first liquid fraction to a contacting zone;

(h) contacting cooled removed first liquid fraction from step (g) with at least a portion of said minor portion of partially cooled vapor from step (c) in the contacting zone, and producing a second liquid fraction; and (i) collecting second liquid fraction from step (h) in the accumulation zone of step (f).

18. The method of claim 17 wherein a single accumulation zone is used for steps (d), (f) and (i), and the accumulation zone comprises a first accumulation section and a second accumulation section having vapor communication with the first accumulation section but being separated from said first accumulation section by a barrier which provides limited flow of liquids between the first accumulation section and the second accumulation section, the first accumulation section and the second accumulation section being at different liquid temperatures, and wherein reflux liquid is returned to the column from the first accumulation section, and vapor from both accumulation sections is passed to the contacting zone.

19. The method of claim 18 wherein the multi-component liquid is a crude oil.

20. A process comprising
(a) distilling a multi-component liquid in a distillation column under conditions effective to provide an overhead vapor fraction having a temperature differential of at least 20° F. between its dew point and its bubble point;

(b) condensing a portion of the overhead fraction in a first condensation zone having at least one condensation stage, and producing a first condensation zone effluent comprising liquid condensate and partially cooled vapor;

(c) separating a minor portion of vapor from said first condensation zone effluent, and passing liquid condensate from step (b) to an accumulation zone;

(d) condensing at least the bulk of the remaining partially cooled vapor from step (b) in a second condensation zone, and producing a second condensation zone effluent comprising vapor and liquid;

(e) passing second condensation zone effluent from step (d) to a separation zone, and separating a first liquid fraction from said second condensation zone effluent, and passing remaining second condensation zone effluent comprising vapor and liquid to an accumulation zone;

(f) removing said first liquid fraction from said separation zone and cooling the removed first liquid fraction, and passing the cooled removed first liquid fraction to a contacting zone;

(g) separating vapor from the second condensation zone effluent;

(h) contacting vapor separated from the second condensation zone effluent and at least a portion of said minor portion of partially cooled vapor from the first condensation zone effluent with cooled removed first liquid fraction in said contacting zone, and producing a second liquid fraction; and (i) collecting second liquid fraction from step (h) in the accumulation zone.

21. The method of claim 20 wherein a single accumulation zone is used for steps (c), (e) and (i), and the accumulation zone comprises a first accumulation section and a second accumulation section having vapor communication with the first accumulation section but being separated from said first accumulation section by a barrier which provides limited flow of liquids between the first accumulation section and the second accumulation section, the first accumulation section and the second accumulation section being at different liquid temperatures, and wherein reflux liquid is returned to the column from the first accumulation section, and vapor from both accumulation sections is passed to the contacting zone.

22. The method of claim 21 wherein the multi-component liquid is a crude oil.

* * * * *